(12) United States Patent
Sadahiro et al.

(10) Patent No.: US 12,248,234 B2
(45) Date of Patent: *Mar. 11, 2025

(54) CAMERA OPTICAL ELEMENT HAVING TACTILE INDICATOR

(71) Applicant: Panavision International, L.P., Woodland Hills, CA (US)

(72) Inventors: Haluki Sadahiro, Oak Park, CA (US); Eddie Ruffel, London (GB); Graham Merritt, London (GB); Dominick Aiello, Oak Park, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,719

(22) Filed: May 24, 2023

(65) Prior Publication Data

US 2024/0077792 A1    Mar. 7, 2024

Related U.S. Application Data

(63) Continuation of application No. 17/317,739, filed on May 11, 2021, now Pat. No. 11,681,206, which is a continuation of application No. 16/379,718, filed on Apr. 9, 2019, now Pat. No. 11,003,060, which is a continuation of application No. 15/487,389, filed on Apr. 13, 2017, now Pat. No. 10,254,634.

(60) Provisional application No. 62/323,481, filed on Apr. 15, 2016.

(51) Int. Cl.
*G03B 11/00* (2021.01)
*G02B 7/00* (2021.01)
*G02B 7/02* (2021.01)
*G03B 17/56* (2021.01)

(52) U.S. Cl.
CPC ............ *G03B 17/565* (2013.01); *G02B 7/006* (2013.01); *G02B 7/02* (2013.01); *G03B 11/00* (2013.01); *G03B 2217/002* (2013.01)

(58) Field of Classification Search
CPC .................................................... G03B 17/565
See application file for complete search history.

(56) References Cited

U.S. PATENT DOCUMENTS

| | | | |
|---|---|---|---|
| 3,732,793 A | 5/1973 | Tague | |
| 3,858,225 A | 12/1974 | Hasegawa et al. | |
| 3,904,279 A | * 9/1975 | Sanada | G03B 17/14 396/529 |

(Continued)

FOREIGN PATENT DOCUMENTS

| | | |
|---|---|---|
| CN | 102998877 A | 3/2013 |
| DE | 202012012442 U1 | 2/2013 |

(Continued)

OTHER PUBLICATIONS

Written Opinion of the International Searching Authority dated Jun. 23, 2017 in corresponding International Application No. PCT/US2017/027569 filed Apr. 1, 2017; total 6 pages.

(Continued)

*Primary Examiner* — Leon W Rhodes, Jr.
(74) *Attorney, Agent, or Firm* — Snell & Wilmer L.L.P.

(57) ABSTRACT

An apparatus including a camera optical element and a tactile indicator associated with the camera optical element for indicating a property of the camera optical element.

20 Claims, 14 Drawing Sheets

(56) References Cited

U.S. PATENT DOCUMENTS

| | | | |
|---|---|---|---|
| 4,118,726 | A | 10/1978 | Kuramoto et al. |
| 4,786,926 | A | 11/1988 | Hurvitz |
| 8,014,166 | B2 | 9/2011 | Yazdani |
| 10,254,634 | B2 | 4/2019 | Sadahiro et al. |
| 10,599,016 | B2 * | 3/2020 | Overall .................. G02B 5/20 |
| 11,003,060 | B2 | 5/2021 | Sadahiro et al. |
| 2002/0164161 | A1 | 11/2002 | Yamaguchi et al. |
| 2004/0076424 | A1 | 4/2004 | Terada et al. |
| 2006/0218493 | A1 | 9/2006 | Murray |
| 2006/0256927 | A1 | 11/2006 | Meittunen |
| 2008/0150905 | A1 | 6/2008 | Grivna et al. |
| 2008/0230773 | A1 | 9/2008 | Dickey et al. |
| 2010/0149408 | A1 | 6/2010 | Ito et al. |
| 2013/0335589 | A1 | 12/2013 | Yuge et al. |
| 2017/0052617 | A1 | 2/2017 | Okuzumi et al. |
| 2017/0123299 | A1 | 5/2017 | Tonev et al. |
| 2024/0094451 | A1 * | 3/2024 | Shiffler ................ G03B 17/565 |

FOREIGN PATENT DOCUMENTS

| | | | |
|---|---|---|---|
| JP | 2013057837 | A | 3/2013 |
| JP | 2015232687 | A | 12/2015 |
| WO | 2000063087 | A1 | 10/2000 |
| WO | 2017180964 | A1 | 10/2017 |

OTHER PUBLICATIONS

International Search Report dated Jun. 23, 2017 in corresponding International Application No. PCT/US2017/027569 filed Apr. 1, 2017; total 4 pages.

International Preliminary Report on Patentability dated Oct. 16, 2018 in corresponding International Application No. PCT/US2017/027569 filed Apr. 1, 2017; total 7 pages.

Non-Final Office Action dated Nov. 14, 2017 in corresponding U.S. Appl. No. 15/487,389, filed Apr. 13, 2017; total 10 pages.

Final Office Action dated Jun. 13, 2018 in corresponding U.S. Appl. No. 15/487,389, filed Apr. 13, 2017; total 11 pages.

Advisory Action dated Aug. 27, 2018 in corresponding U.S. Appl. No. 15/487,389, filed Apr. 13, 2017; total 2 pages.

Notice of Allowance dated Nov. 16, 2018 in corresponding U.S. Appl. No. 15/487,389, filed Apr. 13, 2017; total 7 pages.

Non-Final Office Action dated Apr. 14, 2020 in corresponding U.S. Appl. No. 16/379,718, filed Apr. 9, 2019; total 15 pages.

Final Office Action dated Jul. 27, 2020 in corresponding U.S. Appl. No. 16/379,718, filed Apr. 9, 2019; total 6 pages.

Notice of Allowance dated Oct. 13, 2020 in corresponding U.S. Appl. No. 16/379,718, filed Apr. 9, 2019; total 6 pages.

Notice of Allowance dated Jan. 8, 2021 in corresponding U.S. Appl. No. 16/379,718, filed Apr. 9, 2019; total 10 pages.

Non-Final Office Action dated Mar. 16, 2022 in corresponding U.S. Appl. No. 17/317,739, filed May 11, 2021; total 19 pages.

Notice of Allowance dated Oct. 26, 2022 in corresponding U.S. Appl. No. 17/317,739, filed May 11, 2021; total 9 pages.

Notice of Allowance dated Feb. 22, 2023 in corresponding U.S. Appl. No. 17/317,739, filed May 11, 2021; total 13 pages.

Tiffen ND filter product listing, http://www.tiffen.com/results.html?search_type_no=741&tablename=filters, Archive.org copy dated Sep. 14, 2015 (Year: 2015); total 6 pages.

Tiffen 105C Nd 1.2 Filter product listing at https://web.archive.org/web/20150907195546/http:www.tiffen.com/displayproduct.html?tablename=filters&itemnum=105CND12, Archive. org copy dated Sep. 7, 2015 (Year:2015); total 2 pages.

* cited by examiner

CAMERA OPTICAL ELEMENT HAVING TACTILE INDICATOR

CROSS-REFERENCE TO RELATED APPLICATIONS

This patent application is a continuation of U.S. patent application Ser. No. 17/317,739 filed May 11, 2021, which is a continuation of and claims priority to U.S. patent application Ser. No. 16/379,718 filed Apr. 9, 2019, now U.S. Pat. No. 11,003,060, which is a continuation of U.S. patent application Ser. No. 15/487,389 filed Apr. 13, 2017, now U.S. Pat. No. 10,254,634, which claims the benefit of U.S. Provisional Patent Application No. 62/323,481 filed Apr. 15, 2016, which applications are hereby incorporated by reference in their entirety.

BACKGROUND

Various types of optical elements may be utilized with cameras. Often, such optical elements may need to be rapidly interchanged to produce a desired optical effect. This need may be magnified in cinematic applications, in which optical elements are often rapidly interchanged depending on the particular lighting and framing of a shot. However, it may be difficult to rapidly determine properties of optical elements, especially when the optical elements are used in low light levels. The low light levels may make it difficult for a user to read or otherwise visually identify any marking on the optical element, which may be in the form of letters and/or numerals and are often very small. As such, a need has been identified in the art for a more rapid determination of a property of the optical element, particularly in low or no light conditions.

SUMMARY

Apparatuses, systems, and methods disclosed herein include one or more embodiments of an apparatus comprising a camera optical element, and a tactile indicator coupled to the camera optical element for indicating a property of the camera optical element.

One or more embodiments disclosed herein include an apparatus comprising a frame for a camera optical body, and a tactile indicator coupled to or otherwise disposed on the frame for indicating a property of the camera optical body disposed within the frame.

One or more embodiments disclosed herein include a system comprising a plurality of camera optical elements each having an optical property, and a plurality of tactile indicators each being coupled or otherwise associated with a respective one of the plurality of camera optical elements and indicating the optical property of the respective camera optical element.

One or more embodiments disclosed herein include a method comprising feeling a tactile indicator coupled to or otherwise associated with a camera optical element, and selecting the camera optical element based on a property of the tactile indicator.

BRIEF DESCRIPTION OF THE DRAWINGS

Features and advantages of the systems, apparatuses, and methods as disclosed herein will become appreciated as the same become better understood with reference to the specification, claims, and appended drawings wherein:

DETAILED DESCRIPTION

Figure 1:
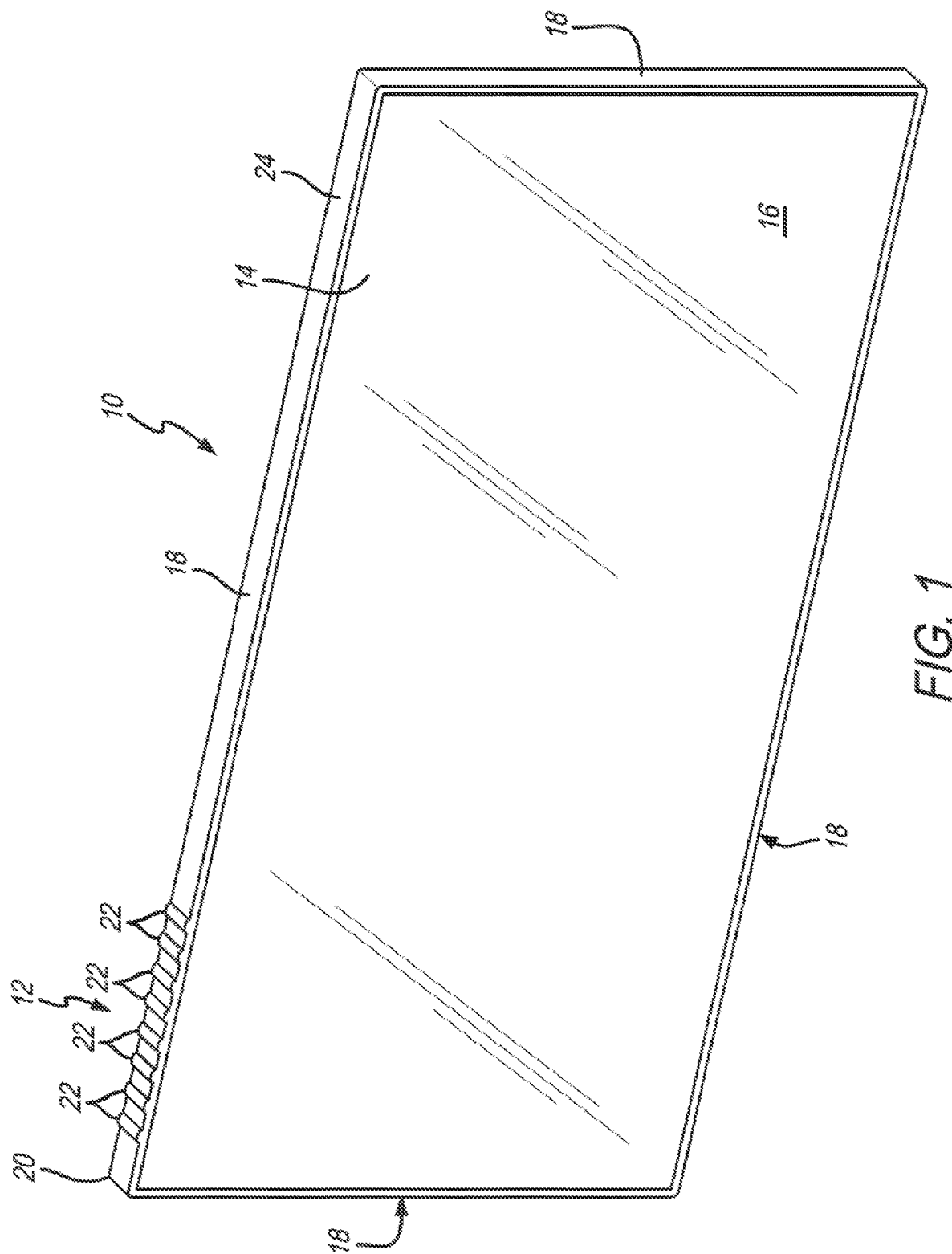
FIG. 1 is a front perspective view of a camera optical element according to an embodiment of the present disclosure.

FIG. 1 illustrates an embodiment of a camera optical element 10 as disclosed herein including a tactile indicator 12. The camera optical element 10 may be configured to produce an optical effect for use with a camera. The camera optical element 10 may be of a kind used in cinematic applications, or other uses such as personal cameras or other camera uses. For example, the camera optical element 10 may be a lens, a filter, or another form of camera optical element. The camera optical element 10 may include an optical body 14, which allows light to pass through and produces an optical effect.

The camera optical element 10 may include a front surface 16, a rear surface (opposite the front surface) and plurality of side surfaces 18. The camera optical element 10 may have a rectangular shape, as shown, or in other embodiments may have other shapes such as circular, triangular, or any other shape as desired.

The tactile indicator 12 is coupled to or otherwise associated with the camera optical element 10. The tactile indicator 12 may be configured to indicate a property of the camera optical element 10 to a user upon the user feeling the tactile indicator 12. The tactile indicator 12 may be positioned on the camera optical element 10 as desired. As shown in FIG. 1, the tactile indicator 12 may be positioned on one of the side surfaces 18 of the camera optical element 10. In one embodiment, the tactile indicator 12 may be positioned on a front, or rear, or other surface of the camera optical element 10. In one embodiment, as shown in FIG. 1, the tactile indicator 12 may be positioned proximate an edge or corner 20 of the camera optical element 10 to allow a user to rapidly determine where the tactile indicator 12 is positioned upon the camera optical element 10.

A property of tactile indicator 12 may indicate a property of camera optical element 10. The shape or material or other property of the tactile indicator 12 may indicate the property of the camera optical element 10.

In the embodiment shown in FIG. 1, the tactile indicator 12 includes surface features 22. The surface features 22 are in the form of variations in the surface of the camera optical element 10. In the embodiment shown in FIG. 1, the surface features 22 take the form of protrusions, however, other embodiments may include cavities. The surface features 22 may be substantially equally sized as shown in FIG. 1, or may have varied sizes. The surface features 22 may have substantially equal shapes as shown in FIG. 1, or may have varied shapes. The surface features 22 may be substantially equally spaced as shown in FIG. 1, or may have varied spacing.

The tactile indicator 12 may be configured to indicate the property of the camera optical element 10 by the quantity of surface features 22 present on the camera optical element 10. For example, in FIG. 1, eight surface features 22 are present on the camera optical element 10. This quantity of surface features 22 may indicate a certain property of the camera optical element 10. If a different number of surface features 22 were present, this may indicate a camera optical element 10 that has a different property.

A user may feel the surface features 22 to determine the property of the camera optical element 10. The tactile nature of the surface features 22 beneficially allows the user to determine a property of the camera optical element 10 in a dark environment. This feature is particularly beneficial in camera applications because the ambient lighting of the subject being imaged by the camera and/or the operator of the camera may be dark, and the user may be unable to see any writings or other visual markings or indicia on the camera optical element 10. In addition, the user may not desire to use a light to see the markings so that the ambient lighting is not disrupted. This need is particularly pertinent in cinematic applications, in which a movie set may be dark, and a cinematographer or cinematographer assistant may be unable to see the markings on the camera optical element. Such a user may also need to rapidly swap out camera optical elements during shooting, and may need to rapidly ascertain the properties of the camera optical element 10. A tactile indicator on the camera optical element 10 beneficially allows such a user to rapidly ascertain the properties of the camera optical element 10 without use of light.

In an embodiment in which the camera optical element 10 is a lens, the tactile indicator 12 may indicate a property such as a type of lens, a magnification of lens, or other property of the lens.

In an embodiment in which the camera optical element 10 is a filter, the tactile indicator 12 may indicate a property such as a type of filter, an amount of light transmission of the filter, or other property of the filter. The camera optical element 10 may be a filter such as a neutral density filter (ND filter), a chromatic filter, a polarizing filter, a diffuser, or other type of filter. In one embodiment, the camera optical element 10 may be a 4×5 or 5×5 or 6×6 ND filter. While particular filter sizes have been presented, it is understood that camera optical elements as disclose here are not limited as the particular size and/or configuration of the filter or optical body that is used.

In an embodiment in which a set of camera optical elements is utilized, the relative quantity of surface features 22 on the camera optical element 10 may correspond to the relative property of the camera optical element 10. For example, if a first camera optical element has a greater quantity of surface features 22 relative to a second camera optical element in a set, then the first camera optical element may have a greater property than the second camera optical element. An inverse relationship may be utilized as well, in which if the first camera optical element has fewer quantity of surface features 22 relative to a second camera optical element in a set, then the second camera optical element may have a greater property than the first camera optical element. A user may be able to rapidly ascertain by feel and a count of the quantity of surface features 22 what the corresponding property of the camera optical element is. Other variations in properties of tactile indicators 12, such as shape or the like, could indicate the relative property of the camera optical elements.

In one embodiment, the quantity of surface features 22 may correspond to an actual numerical property of the camera optical element 10. For example, in an embodiment in which the element 10 is a neutral density filter, the number of surface features 22, such as 2, may correspond to a 2 f-stop reduction number, or number of stops, or other property of the camera optical element 10.

In the embodiment shown in FIG. 1, the tactile indicator 12 is coupled to a frame 24. The frame 24 may completely or partially surround the optical body 14. The frame 24 may be a single piece or multi-piece. The frame 24 may fit around the optical body 14 and may provide additional protection to the optical body 14 from damage. The frame 24 may be made of a material such as metal or plastic, or other material. The frame 24 may reduce nicks and scratches to the optical body 14, e.g., when made from glass, and may provide protection if the camera optical element 10 is dropped or placed into position with the camera. The frame 24 may be fit to the optical body 14 with an adhesive (for example, an epoxy) or other method of bonding and/or may be fit by interference. The frame 24 may also produce a larger surface area for the tactile indicator 12 to be positioned on the camera optical element 10, which may be a larger surface area than may be available due to the optical body 14. As such, the dimensions of the optical body 14 may not need to be varied to produce a larger tactile indicator 12.

In one embodiment, a frame 24 may not be used and the tactile indicator 12 may be coupled to or otherwise associated with the camera optical element 10 by being directly placed upon or being integral with the optical body 14. The tactile indictor 12 may be coupled to or otherwise associated with the optical body 14 via cutting, etching, engraving, or carving into the optical body 14 or other form of placement, e.g., along an edge portion of the optical body.

Figure 2:
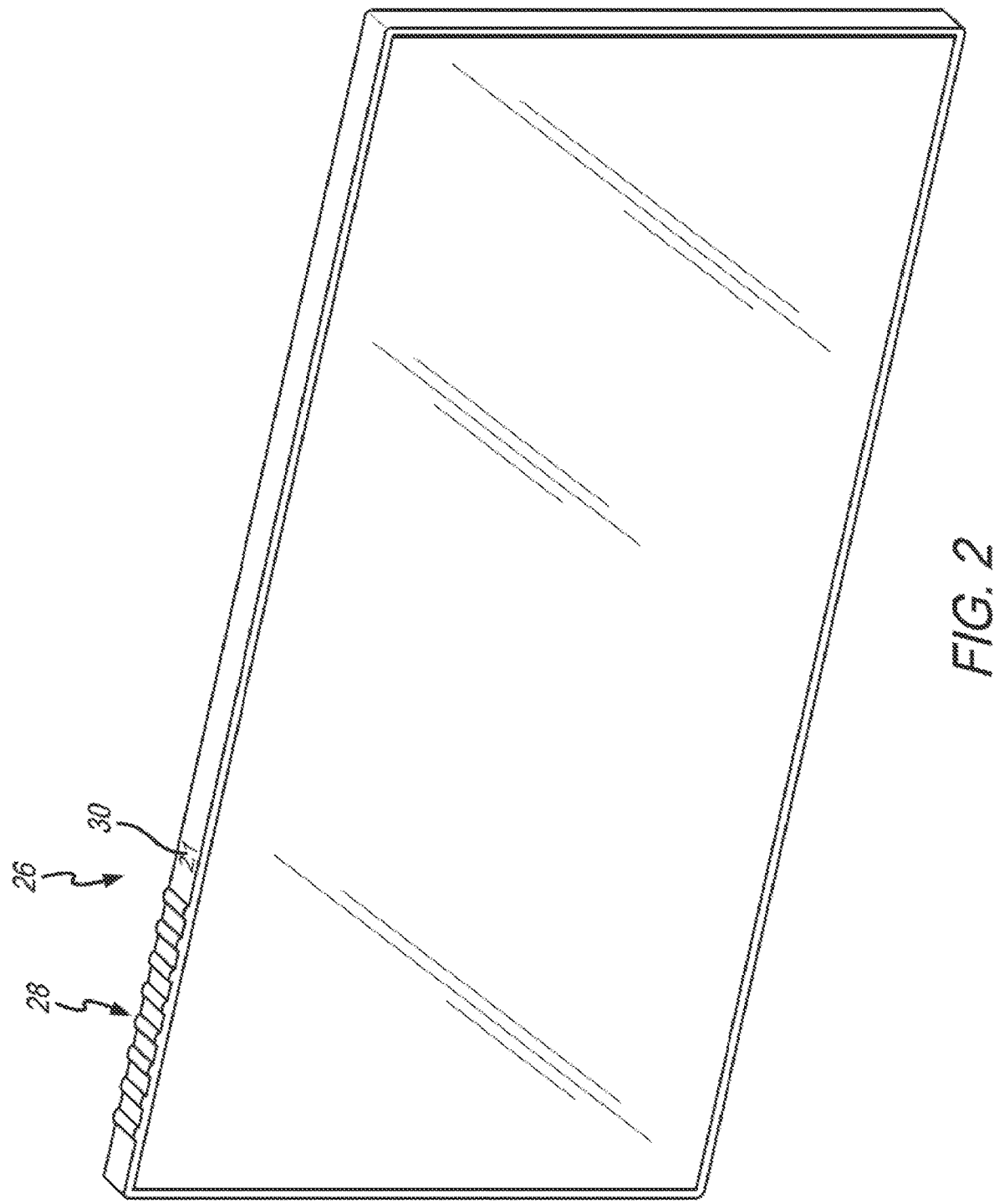
FIG. 2 is a front perspective view of a camera optical element according to an embodiment of the present disclosure.

FIG. 2 illustrates a camera optical element 26 with a tactile indicator 28 coupled thereto. The tactile indicator 28 is positioned on a frame 30. A numerical value may be printed or otherwise disposed on frame 30 that corresponds to a property of the camera optical element 26. For example, the camera optical element 26 may be a neutral density filter, and the numerical value may correspond to the amount of light transmission of the filter. The numerical value may correspond to the ND number notation of the filter. The tactile indicator 28 may be configured to indicate the amount of light transmission of the filter, without the user having to read the numerical value. A hand of a user is shown, which may manipulate or touch the tactile indicator 28 to determine the property of camera optical element.

Figure 3:
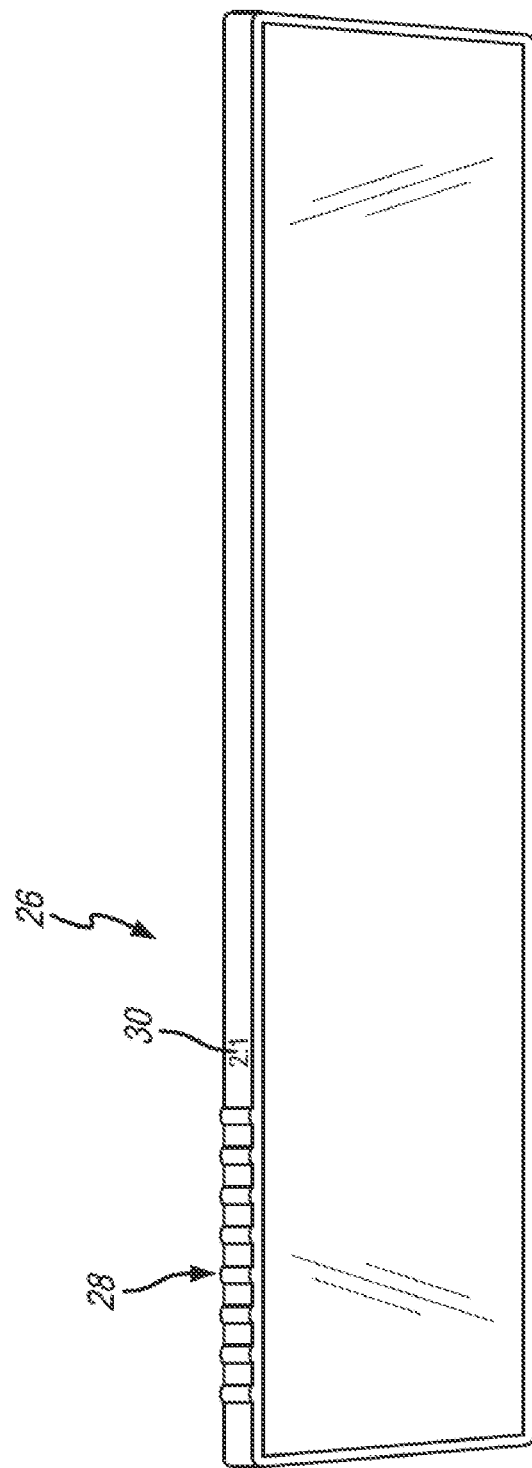
FIG. 3 is a top perspective view of the camera optical element of FIG. 2.

FIG. 3 is top perspective view of the camera optical element 26. The tactile indicator 28 is positioned on a side surface of camera optical element 26.

Figure 4:
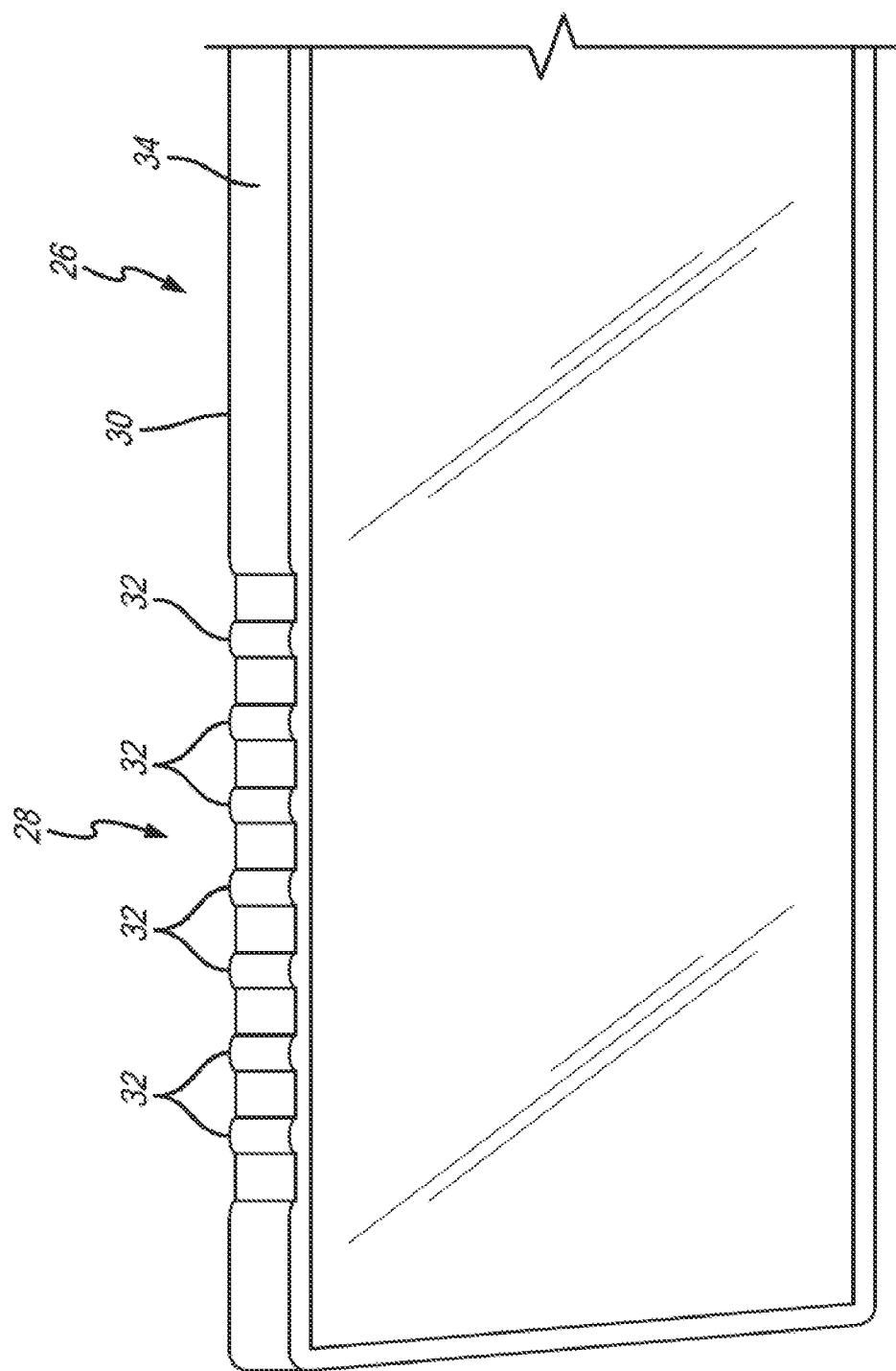
FIG. 4 is a close up perspective view of a portion of the camera optical element of FIG. 2.

FIG. 4 is close up view of tactile indicator 28, including a plurality of surface features 32. The surface features 32 may be configured to a have a height that is the same or less than the remainder of the side surface 34 of the frame 30. The height of the surface features 32 may allow the camera optical element 26 to smoothly fit into a camera housing so that the tactile indicator 28 does not impede movement of the camera optical element 26.

Figure 5:
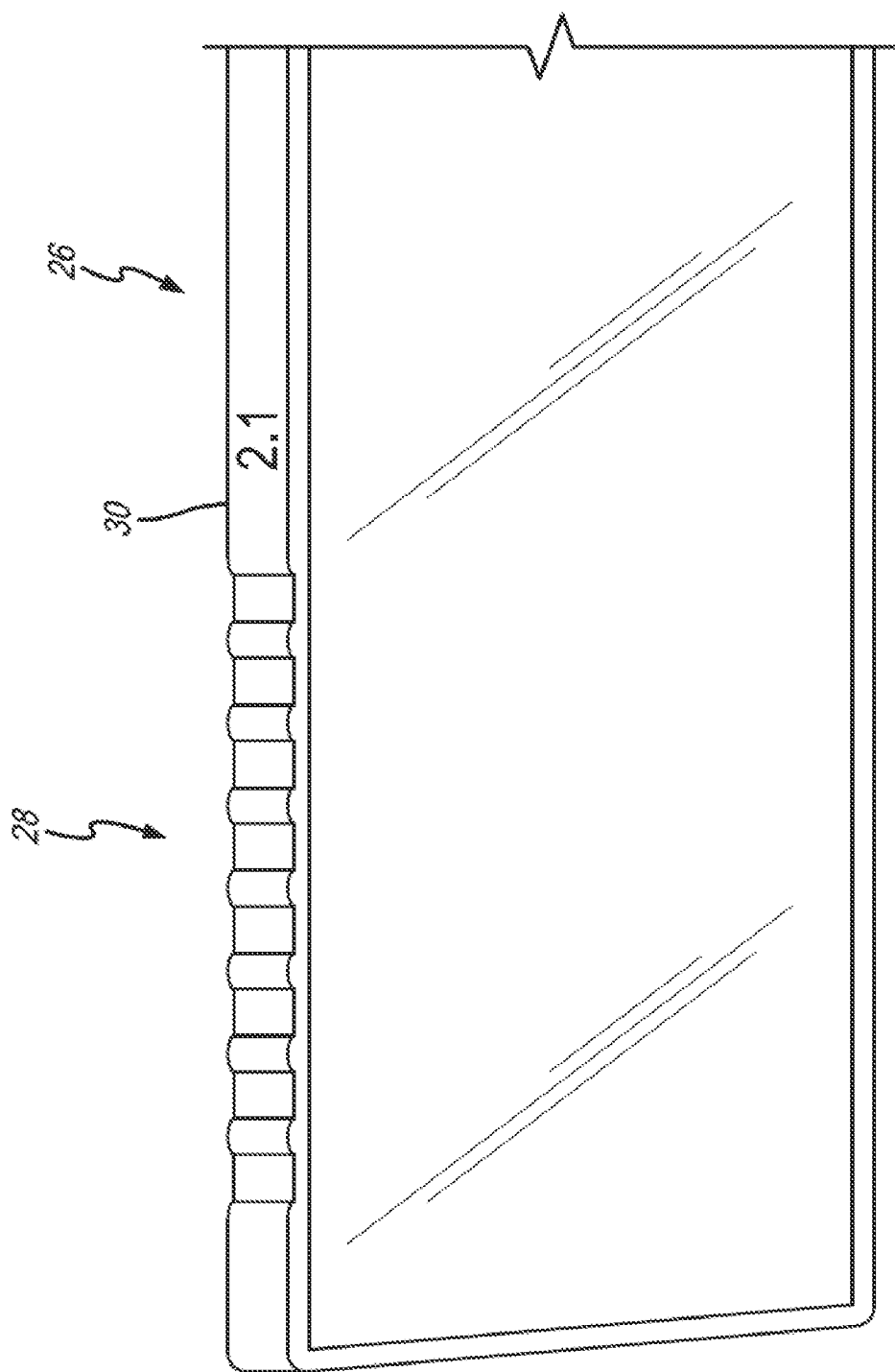
FIG. 5 is a close up perspective view of a portion of the camera optical element of FIG. 2.

FIG. 5 illustrates a close up view of tactile indicator 28.

Figure 6:
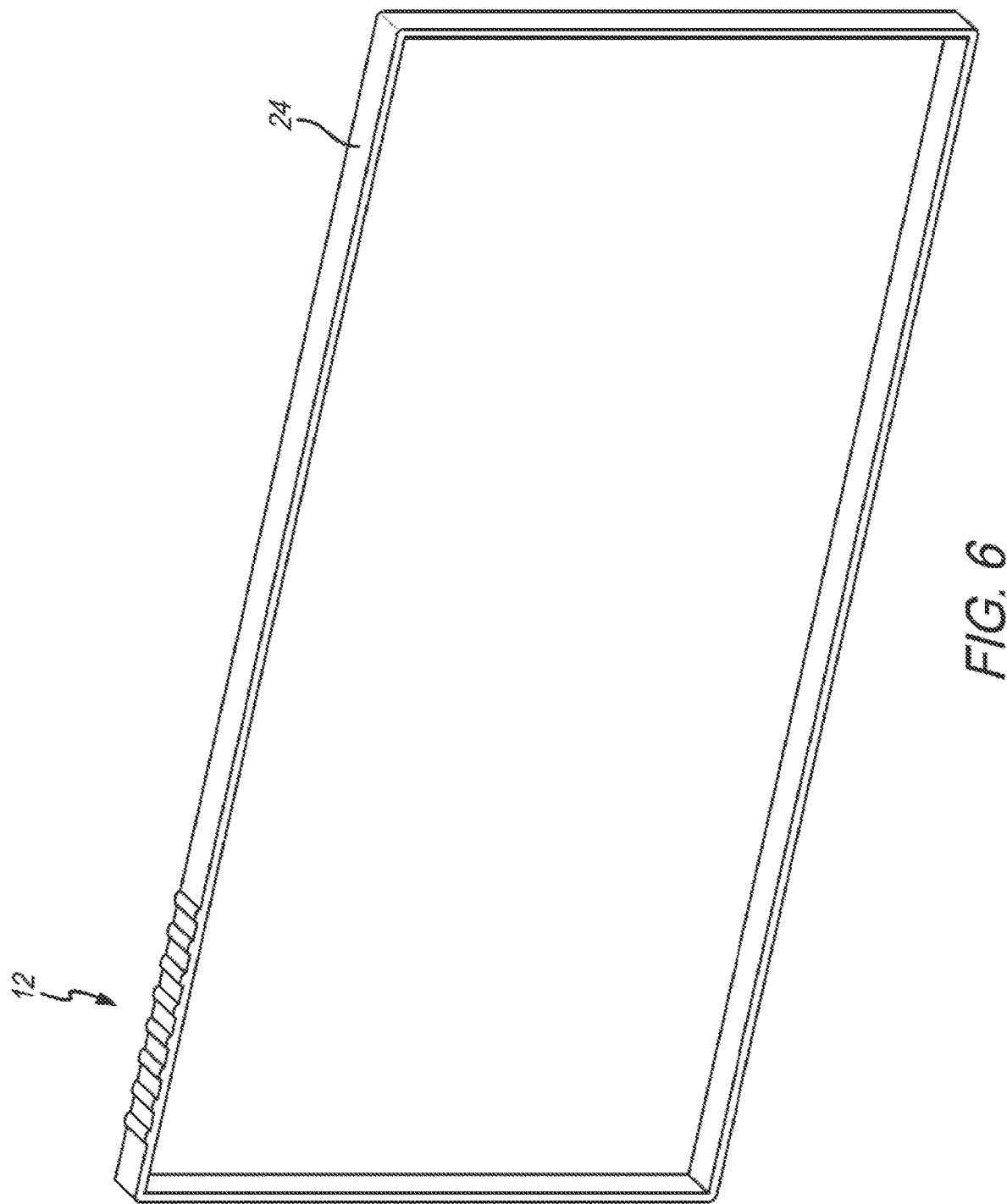
FIG. 6 is a front perspective view of a frame of the camera optical element of FIG. 1.

FIG. 6 illustrates the frame 24 of FIG. 1 without the optical body coupled thereto. The frame 24 may be constructed separately from the optical body. The tactile indicator 12 may be produced on the frame 24. The frame 24 may then be installed onto the optical body. The frame 24 may be sized to form fit the shape of the optical body. This method of manufacture may allow a frame 24 or tactile indicator 12 to modify a pre-formed or standard optical body, or optical bodies having a variety of shapes. In one embodiment, the optical body may be sized to fit the frame 24, for example, the optical body may be reduced in size to account for the additional size of the frame 24.

Figure 7:
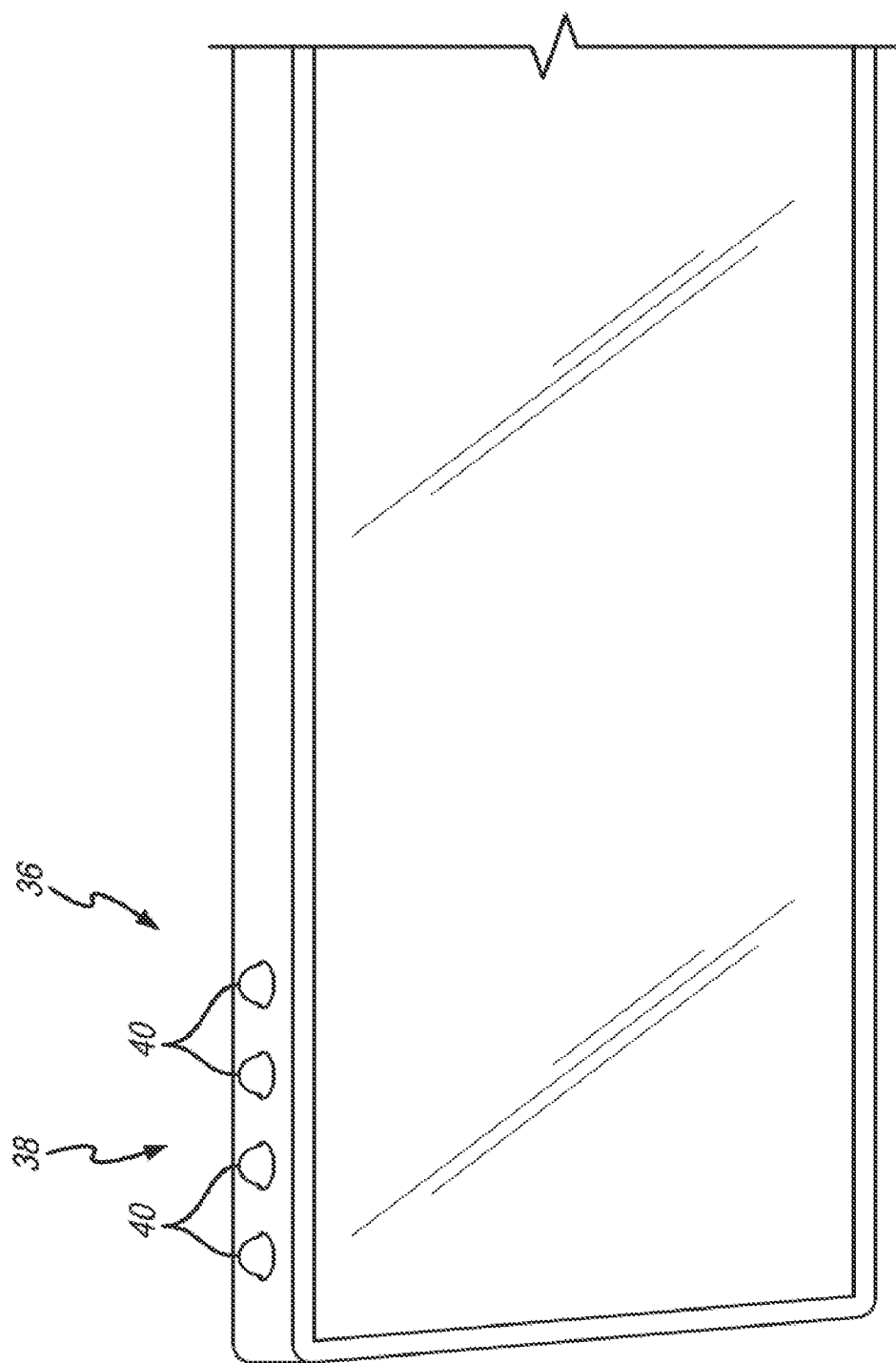
FIG. 7 is a close up perspective view of a portion of a camera optical element according to an embodiment of the present disclosure.

FIG. 7 illustrates a close up view of a corner of a camera optical element 36, including a tactile indicator 38. The tactile indicator 38 includes surface features 40 in the form of protrusions, specifically bumps. In the embodiments shown in FIGS. 1 and 4, the protrusions may be in the form of ridges that each project outwardly a desired distance and having a desired shape and separation from one another to produce the intended tactile result. In an example, the ridges may have a rounded, squared, or other configured top surface and be rectangular in configuration. The ridges may be separated by cavities in the form of valleys and the valleys may be configured to provide a desired spacing of the ridges to ensure a desired tactile result. If desired, the valleys may comprise coloring or the like to additionally provide a visual reference adding to the tactile reference provided by the protrusions. In an example, the valleys may be colored red to provide a visual reference. Alternatively, the valleys may comprise a phosphorescent material or the like disposed therein that may provide a visual indication when excited or otherwise activated by shining a light thereon, which light may be in any wavelength, visible or nonvisible useful for exciting the material in the valleys to produce the visual indication. The ridges and valleys may extend along a partial or total width or thickness of the frame 30 as shown in FIG. 4 for example. In FIG. 7, bumps may be utilized. In an example, the bumps may have a rounded circular, flat squared, or other configured top surface projecting outwardly a desired distance from the optical element or frame extending thereover. The user may feel the quantity of bumps to determine the property of the camera optical element 36.

Figure 8:
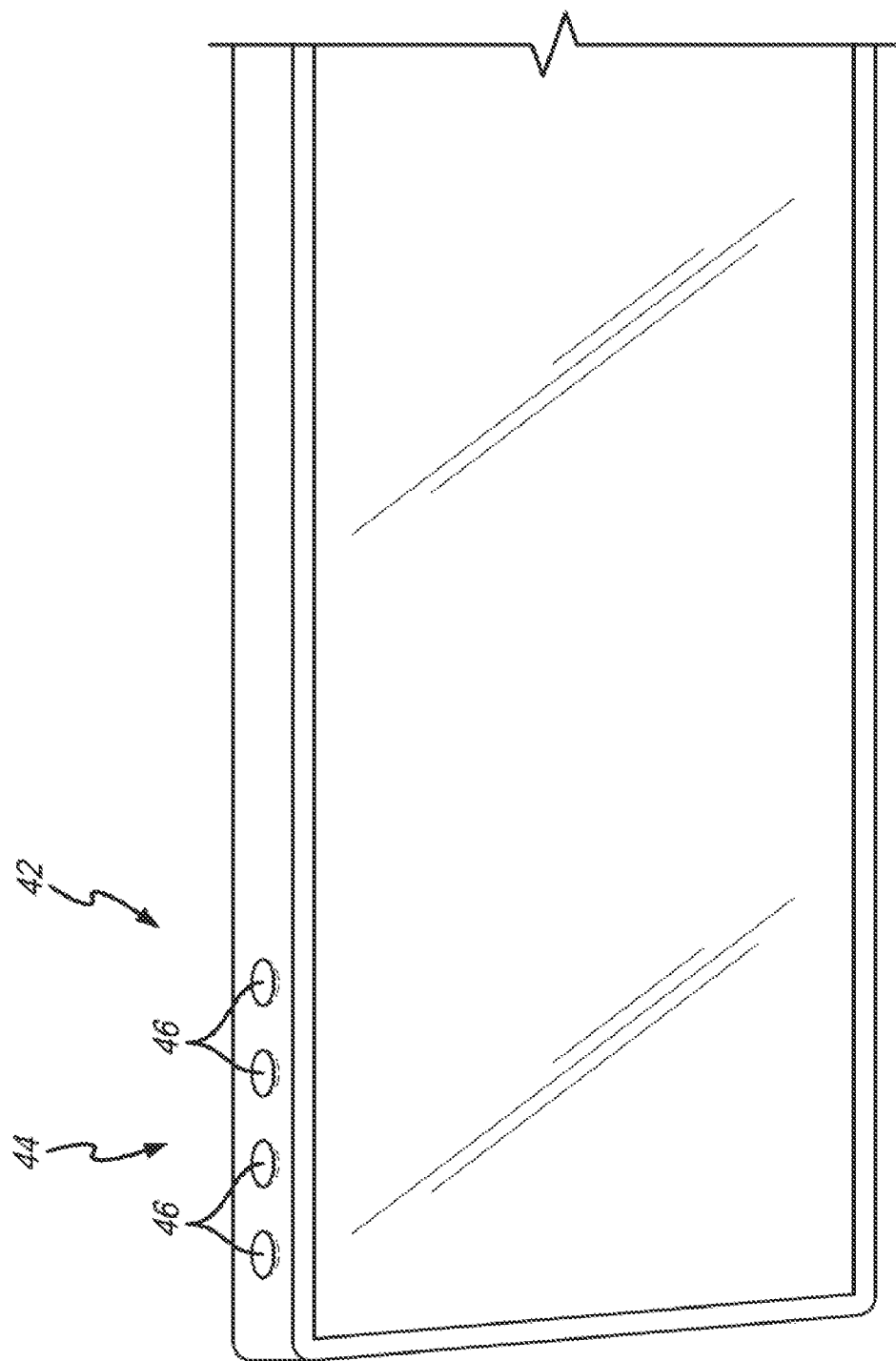
FIG. 8 is a close up perspective view of a portion of a camera optical element according to an embodiment of the present disclosure.

FIG. 8 illustrates a close up view of a corner of a camera optical element 42, including a tactile indicator 44. The tactile indicator 44 includes surface features 46 in the form of cavities, specifically divots. The user may feel the quantity of divots to determine the property of the camera optical element 42. If desired, the cavities may be colored or otherwise treated to provide a visual indication as disclosed above for the valleys in addition to the tactical indication.

Figure 9:
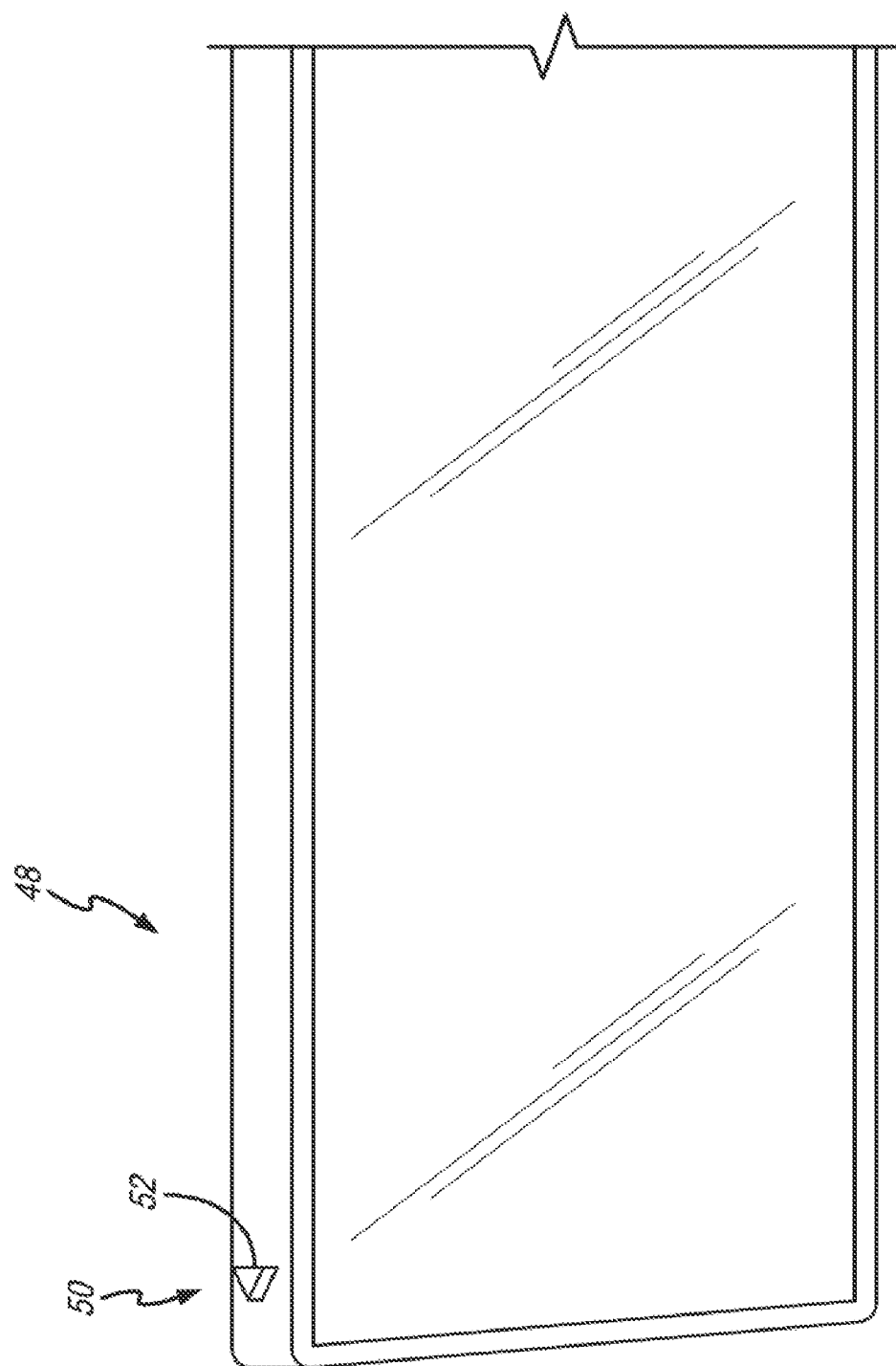
FIG. 9 is a close up perspective view of a portion of a camera optical element according to an embodiment of the present disclosure.
Figure 10:
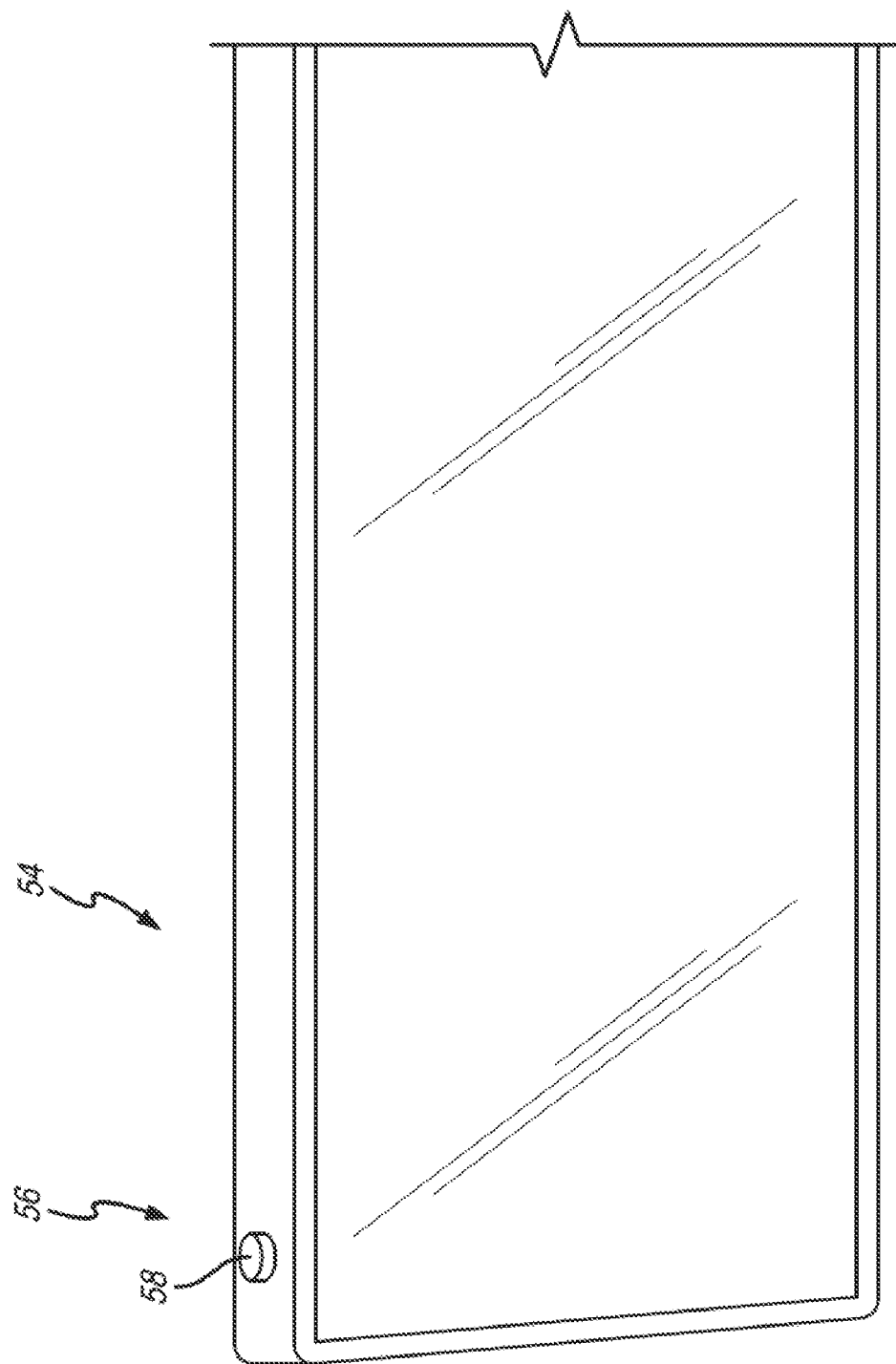
FIG. 10 is a close up perspective view of a portion of a camera optical element according to an embodiment of the present disclosure.

FIG. 9 illustrates a close up view of a corner of a camera optical element 48, including a tactile indicator 50. The tactile indicator 50 may include a surface feature 52 in the form of a protrusion extending outwardly a distance from the optical element and having a prism shape. The particular shape of the surface feature 52 may indicate the property of the camera optical element 48. In FIG. 9, a triangular shape may be presented to user. In a corresponding manner, FIG. 10 illustrates a close up view of a corner of a camera optical element 54 including tactile indicator 56 including a surface feature 58 in the form of a protrusion having a cylindrical shape. A circular shape may be presented to user. The shape may indicate a property of the camera optical element 54. Other shapes may be used, including rectangular, hexagonal, and others. The shapes may be used in a combination in a set of camera optical elements, for example, a triangular shape may correspond to a certain property and/or type, and a circular shape may correspond to a certain other property and/or type of camera optical element.

In other embodiments, other forms of surface features than the protrusions and cavities shown in FIGS. 1-10 may be utilized.

Figure 11:
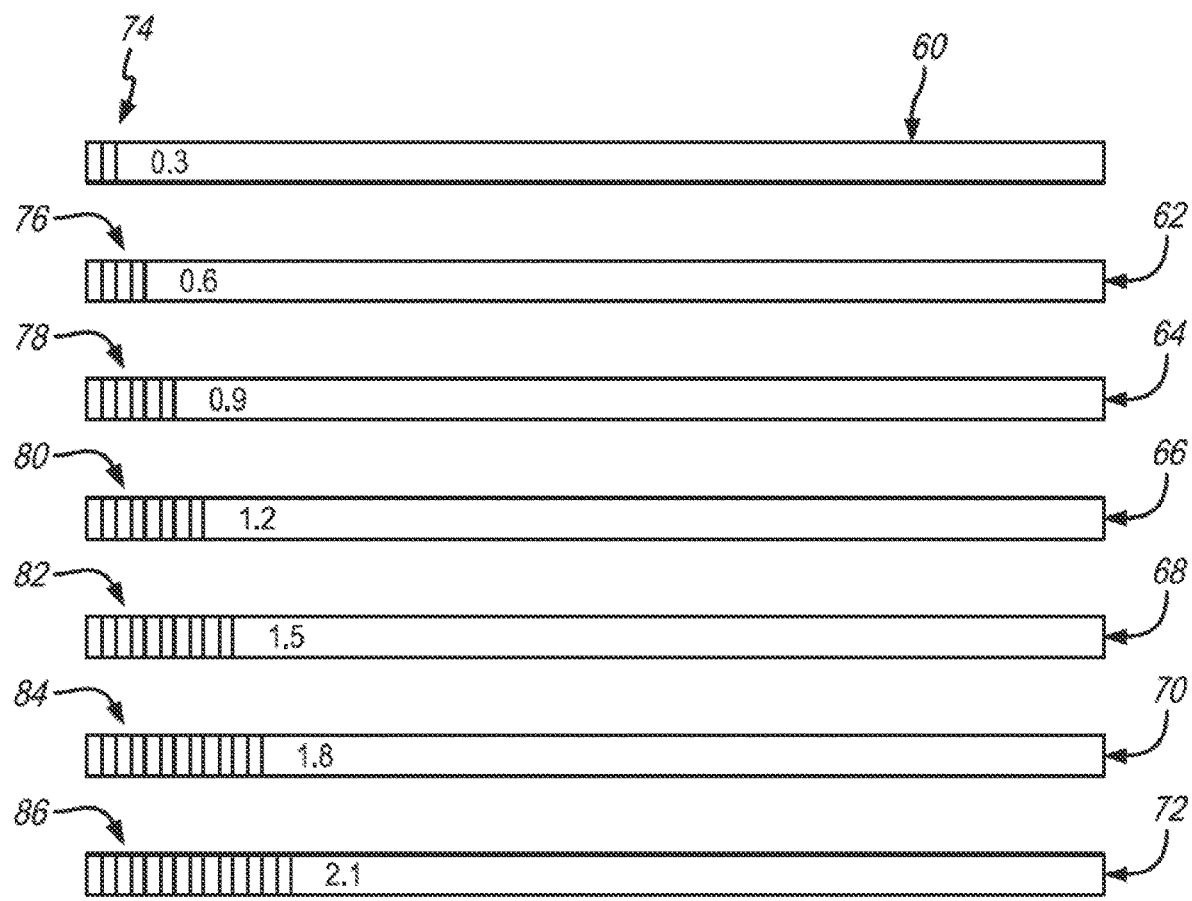
FIG. 11 is a top view of a set of camera optical elements according to an embodiment of the present disclosure.

FIG. 11 illustrates a top view of a set of camera optical elements 60-72. Each of the camera optical elements 60-72 has a different property. For example, each optical element 60-72 is a filter, such as a neutral density filter that has a differing amount of light transmission. Each optical element 60-72 has a corresponding different tactile indicator 74-86. Each tactile indicator 74-86 has different quantity of surface features such as protrusions or cavities or other surface features. IN this example, the quantity of surface features corresponds to the property of the respective optical element 60-72. For example, tactile indicator 74 has one surface feature, and tactile indicator 76 has two surface features. The presence of two surface features may indicate a greater or lower amount of light transmission. In the embodiment shown in FIG. 11, the numerical values on the tactile indicators 74-86 correspond to ND number notation. Accordingly, the presence of two surface features indicates a lesser light transmission than the presence of one surface feature. A user may feel the number of surface features in the camera optical elements 60-72 of the set to determine the relative properties of the camera optical elements 60-72.

Figure 12:
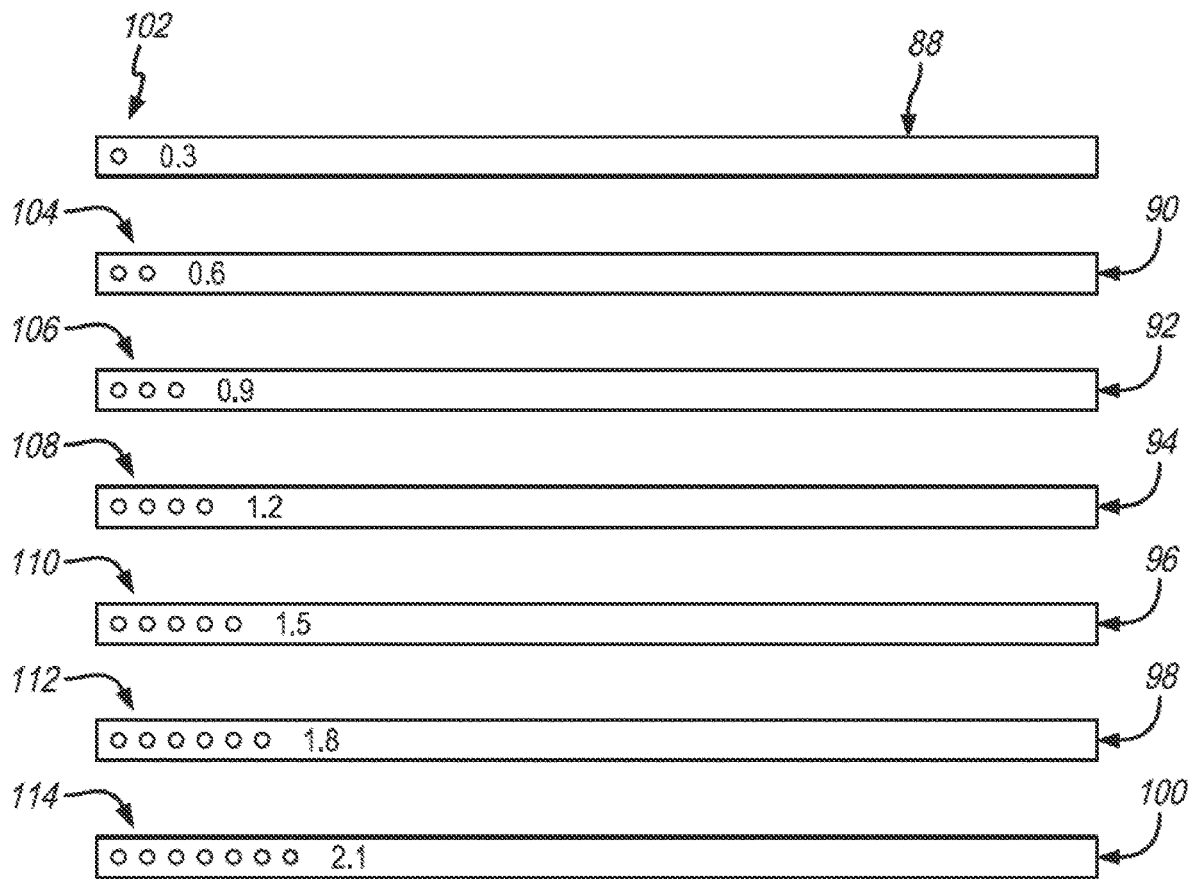
FIG. 12 is a top view of a set of camera optical elements according to an embodiment of the present disclosure.

FIG. 12 illustrates a top view of a set of camera optical elements 88-100. Each of the camera optical elements 88-100 has a different property and a corresponding different tactile indicator 102-114. The tactile indicators 102-114 have a different shape than those shown in FIG. 11, as the tactile indicators 102-114 do not extend across the width of the camera optical elements 88-100.

Figure 13:
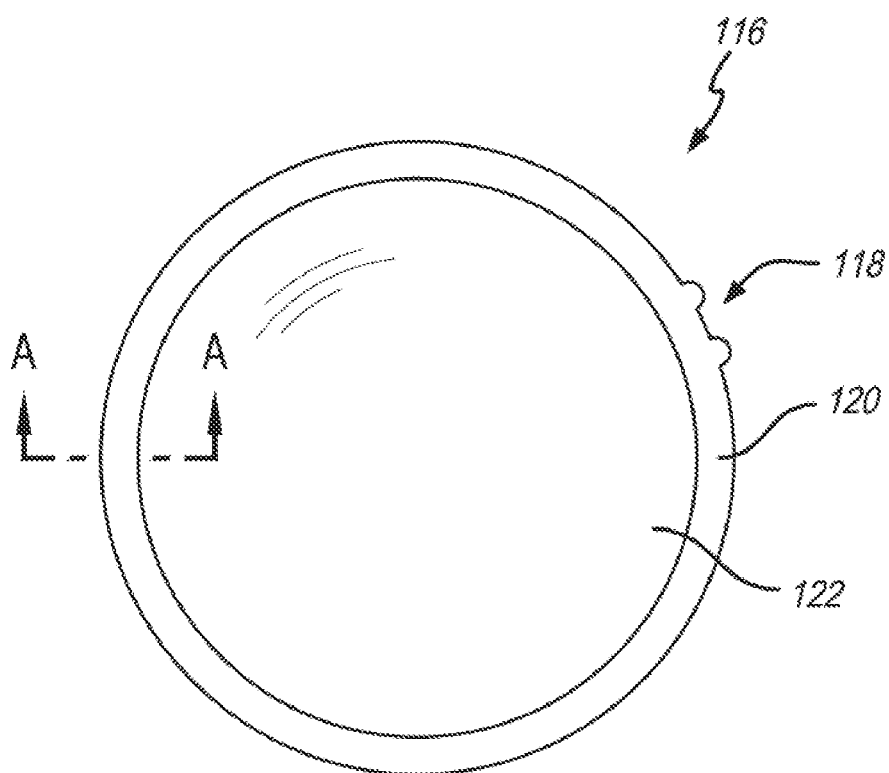
FIG. 13 is a front view of a camera optical element according to an embodiment of the present disclosure.

FIG. 13 illustrates a front view of a circular camera optical element 116. The camera optical element 116 may have the form of a lens. The tactile indicator 118 may be coupled to a frame 120 that completely or partially surrounds the optical body 122. The frame 120 has a circular shape. The tactile indicator 118 may indicate the type of lens, or other property of the lens.

Figure 14:
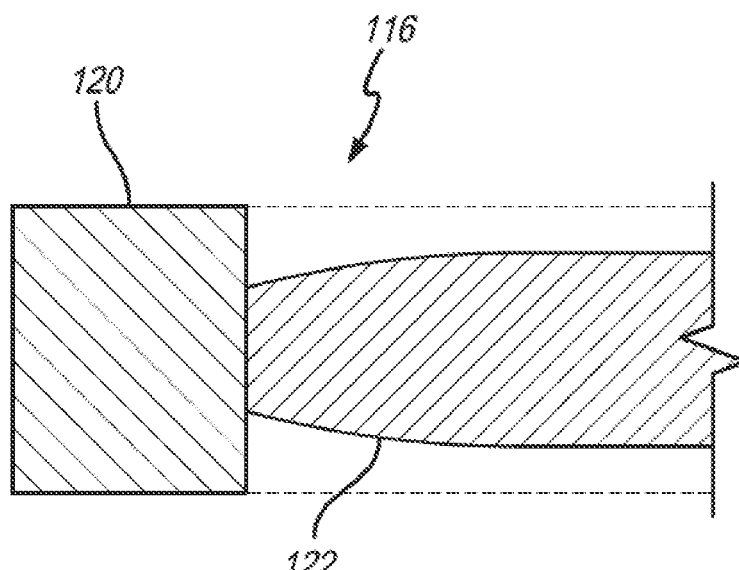
FIG. 14 is a cross section view of the camera optical element of FIG. 13 along line A-A.

FIG. 14 illustrates a cross section along line A-A of FIG. 13. The frame 120 may extend in an axial direction further than the surface of the optical body 122. This feature may allow the frame 120 to protect the surface of the optical body 122 if the camera optical element 116 were dropped.

Figure 15:
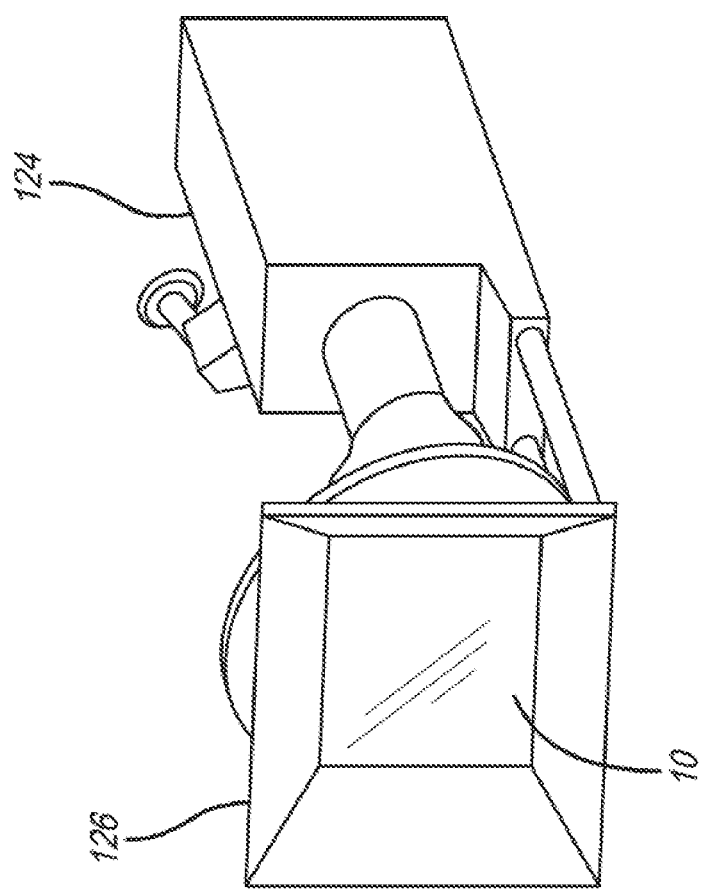
FIG. 15 is a front perspective view of a camera having a camera housing according to an embodiment of the present disclosure.

FIG. 15 illustrates a perspective view of a camera 124 including a camera housing 126. The camera housing 126 may be a device such as a matte box or other form of housing. A camera optical element such as the camera optical element 10 shown in FIG. 1 may be coupled to the camera housing 126. In operation, a user may have felt a tactile indicator and selected the camera optical element based on the tactile indicator. The user may have felt the corner of the camera optical element to determine where the tactile indicator was positioned. The user may have felt the tactile indicator by sliding his/her finger across the outer surface of the camera optical element. The user may have selected the camera optical element from a set of other camera optical elements. The user may have rapidly determined the property of the camera optical element based on the tactile indicator and coupled the desired camera optical element to the camera housing 126. The presence of the frame 24 may protect the camera optical element 10 as it is coupled to the camera housing 126, and to secure the camera optical element 10 to the housing via an interference fit. Other methods of use may utilize the other features disclosed in this application.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary. The terms "approximate[ly]" and "substantial[ly]" represent an amount that may vary from the stated amount, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. An apparatus comprising:
   a camera optical element in the form of an optical filter; and
   a tactile indicator associated with the camera optical element for indicating a fixed property of the optical filter.

2. The apparatus of claim 1, wherein the optical filter is a neutral density filter.

3. The apparatus of claim 1, wherein the fixed property of the camera optical element comprises an amount of light transmission of the neutral density filter.

4. The apparatus of claim 1, wherein the tactile indicator includes at least one surface feature associated with the camera optical element.

5. The apparatus of claim 4, wherein the camera optical element includes a front surface, a rear surface, and a plurality of side surfaces, and the at least one surface feature is positioned on at least one of the plurality of side surfaces.

6. The apparatus of claim 1, further comprising a visual indicator associated with the camera optical element for indicating a property of the camera optical element.

7. The apparatus of claim 6, wherein the visual indicator is positioned adjacent the tactile indicator.

8. The apparatus of claim 1, wherein the tactile indicator comprises surface features that are spaced apart from each other.

9. The apparatus of claim 1, wherein the camera optical element comprises an optical body and a frame disposed over at least a portion of the optical body, the tactile indicator being positioned on the frame.

10. An optical element for use with a camera, the optical element comprising:
- a camera optical body comprising a neutral density filter;
- a frame extending along at least a portion of the camera optical body; and
- a tactile indicator associated with the frame for indicating a fixed optical property of the neutral density filter.

11. The apparatus of claim 10, wherein the frame is positioned along a radial side of the camera optical body.

12. The apparatus of claim 11, wherein the frame extends along an edge portion of the optical element, and the tactile indicator includes one or more surface features positioned on an outside surface of the frame.

13. A system comprising:
- two or more camera optical elements comprising neutral density filters each having a fixed optical property; and
- a tactile indicator that is associated with each of the two or more camera optical elements, wherein each tactile indicator is configured to indicate the fixed optical property of the respective camera optical element.

14. The system of claim 13, wherein the fixed optical property of the two or more camera optical elements is an amount light transmission that differs from one another.

15. The system of claim 13, wherein each tactile indicator comprises one or more surface features configured to convey the fixed optical property of the respective camera optical element.

16. The system of claim 13, wherein each camera optical element comprises an optical element and a frame extending along a portion of the optical element, and wherein the tactile indicator is disposed along an outside surface of the frame.

17. A method comprising:
- feeling a tactile indicator associated with a camera optical element comprising a neutral density filter; and
- selecting the camera optical element based on a fixed optical property of the camera optical element that is an amount of light transmission as conveyed by the tactile indicator.

18. The method of claim 17, further comprising coupling the camera optical element to a camera housing.

19. The method of claim 17, wherein the tactile indicator comprises one or more surface features, and the step of feeling comprises determining at least one of a quantity or shape of the one or more surface features.

20. The method of claim 17, further comprising viewing a visual indicator associated with the camera optical element that conveys the optical property of the camera optical element.

* * * * *